US009569068B2

(12) United States Patent
Yeh (10) Patent No.: US 9,569,068 B2
(45) Date of Patent: Feb. 14, 2017

(54) DISPLAY DEVICE AND METHOD FOR NAVIGATING BETWEEN DISPLAY LAYERS THEREOF

(71) Applicant: FIH (Hong Kong) Limited, Kowloon (HK)

(72) Inventor: Wang-Hung Yeh, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 284 days.

(21) Appl. No.: 14/517,224

(22) Filed: Oct. 17, 2014

(65) Prior Publication Data

US 2015/0121263 A1 Apr. 30, 2015

(30) Foreign Application Priority Data

Oct. 31, 2013 (TW) .................................. 012139478

(51) Int. Cl.
```
G06F 3/048       (2013.01)
G06F 3/0481      (2013.01)
G06F 3/0482      (2013.01)
G06F 3/0483      (2013.01)
G06F 3/0488      (2013.01)
```
(52) U.S. Cl.
CPC ......... *G06F 3/04817* (2013.01); *G06F 3/0482* (2013.01); *G06F 3/0483* (2013.01); *G06F 3/04815* (2013.01); *G06F 3/04883* (2013.01)

(58) Field of Classification Search
CPC .................................................. G06F 3/04817
USPC ....................................................... 715/765
See application file for complete search history.

(56) References Cited

U.S. PATENT DOCUMENTS

| | | | | |
|---|---|---|---|---|
| 9,201,585 B1* | 12/2015 | Karakotsios | .......... | G06F 3/0488 |
| 2010/0283743 A1* | 11/2010 | Coddington | .......... | G06F 3/0485 345/173 |
| 2011/0179368 A1* | 7/2011 | King | .......... | G06F 3/04815 715/769 |
| 2012/0089950 A1* | 4/2012 | Tseng | .......... | G06F 3/0484 715/854 |
| 2012/0159402 A1* | 6/2012 | Nurmi | .......... | G06F 3/04883 715/863 |
| 2012/0192121 A1* | 7/2012 | Bonnat | .......... | G06F 3/0488 715/863 |
| 2012/0249475 A1* | 10/2012 | Murphy | .......... | G06F 1/1694 345/174 |

(Continued)

*Primary Examiner* — William Bashore
*Assistant Examiner* — Henry Orr
(74) *Attorney, Agent, or Firm* — Zhigang Ma (57) ABSTRACT

A method for navigating between display layers is applied in a display device. The display device includes a touch screen and a display panel. The method includes following steps of determining a target display layer according to whether a pinching gesture or an expanding gesture is performed. When the expanding gesture is performed, expanding a distance between relevant columns or rows of icons currently displayed to reveal icons on the target display layer, and visually compressing formerly-displayed icons to two opposite edges of the display panel during the expanding gesture. When the pinching gesture is performed, narrowing a distance between columns or rows of icons on the target display layer which are introduced respectively from the two opposite edges to cover columns and rows of old icons, and visually expanding the newly-introduced icons during the pinching gesture.

20 Claims, 7 Drawing Sheets

(56) References Cited

U.S. PATENT DOCUMENTS

2014/0173530 A1* 6/2014 Mesguich
  Havilio ................ G06F 3/0482
  715/863
2014/0173721 A1* 6/2014 Shenfield ............. G06F 3/0488
  726/21
2014/0245232 A1* 8/2014 Bailiang ............ G06F 3/04815
  715/850

* cited by examiner

DISPLAY DEVICE AND METHOD FOR NAVIGATING BETWEEN DISPLAY LAYERS THEREOF

FIELD

The present disclosure relates to display devices, and particularly to a display device capable of navigating between display layers and a method for navigating between display layers.

BACKGROUND

Many electronic devices provide a graphical user interface (GUI) that allows users to interact with the various functionalities provided by the electronic device. The GUI employs a number of icons displayed on a number of screens. The icons may be program icons that allow a user to select and execute an application or functionality in the electronic device, such as opening a web browser, starting an email application, playing a game or other types of functionality. A user will navigate between different screens using a touch gesture such as a swipe so as to view and select an icon displayed on a different screen.

BRIEF DESCRIPTION OF THE DRAWINGS

Implementations of the present technology will be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be made to function without these specific details. In other instances, methods, procedures, and components have not been described in detail so as not to obscure the feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure follow.

The term "comprising," means "including, but not necessarily limited to" and specifically indicates open-ended inclusion or membership in a combination, group, series, or the like.

Figure 1:
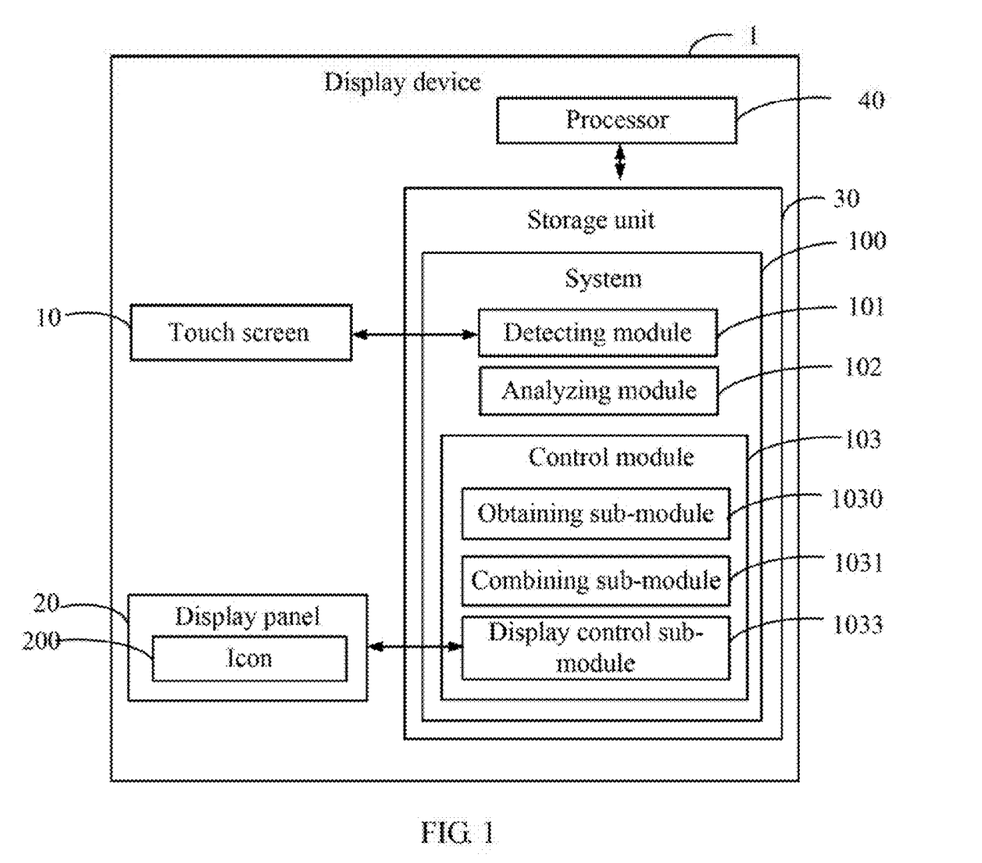
FIG. 1 is a block diagram of an embodiment of a display device capable of navigating between display layers.

FIG. 1 is a block diagram of an embodiment of a display device 1. The display device 1, such as a mobile phone, a digital photo frame, or a tablet computer, includes a touch screen 10, a display panel 20, a storage unit 30, and a processor 40. The display panel 20 can display a plurality of display layers, each including icons 200 arranged in columns and rows. The storage unit 30 can store a system 100 for navigating between different display layers. The system 100 can include a variety of modules as a collection of software instructions executable by the processor 40 to navigate between display layers, thus icons 200 displayed on different display layers are available for selection by a user.

The system 100 can include a detecting module 101, an analyzing module 102, and a control module 103.

The detecting module 101 detects touches on the touch screen 10, and detects positional information of each detected touch.

The analyzing module 102 identifies whether a pinching gesture or an expanding gesture is performed on the touch screen 10 according to the detected positional information, and determines a target display layer accordingly. The pinching gesture or the expanding gesture is detected when two fingertips of the user are placed on the touch screen 10 and the distance between the fingertips is decreased or increased. In at least one embodiment, the analyzing module 102 further identifies whether the fingertips are placed on either side of an imagined vertical line between two columns of icons or an imagined horizontal line between two rows of icons 200 currently being displayed, before determining the target display layer.

Figure 2:
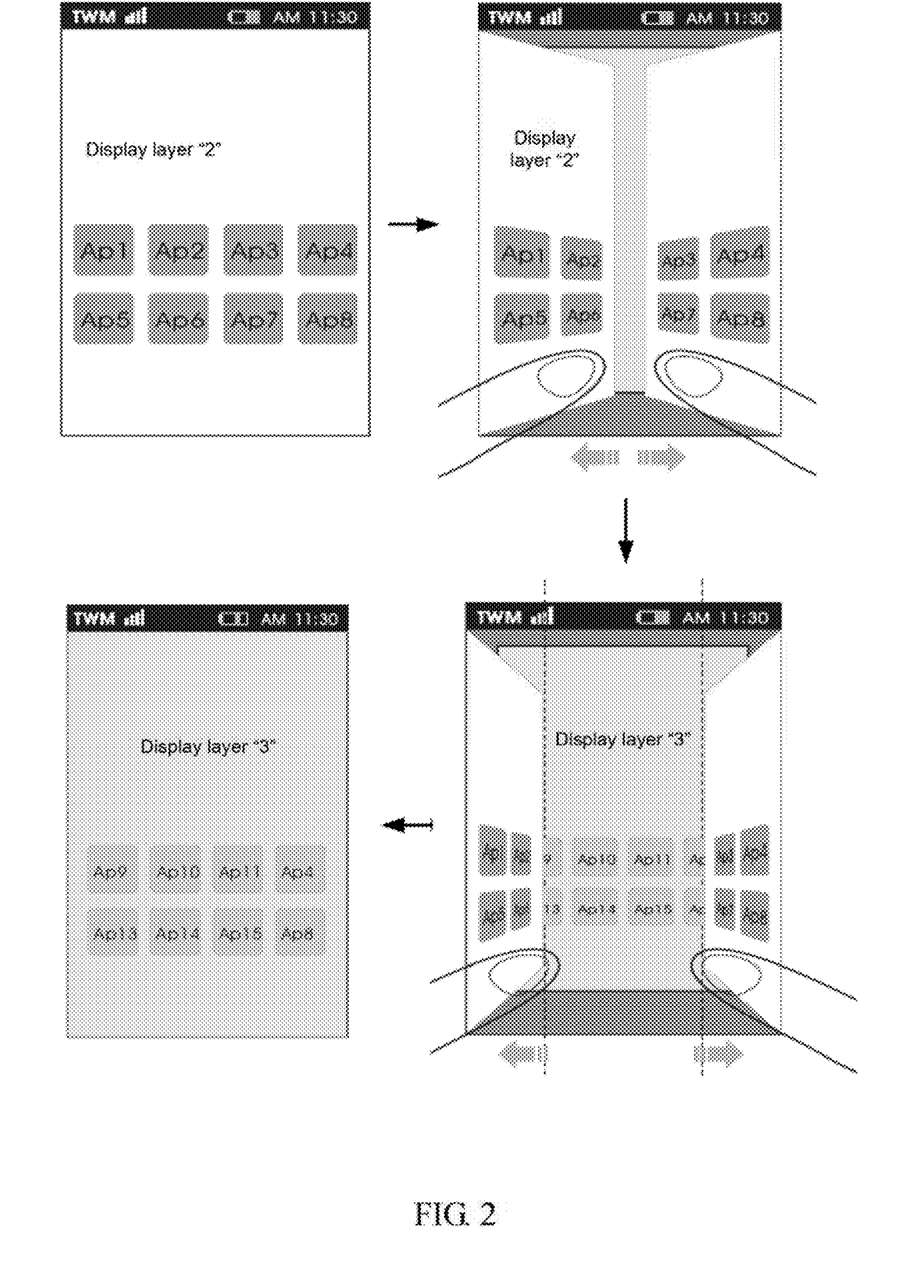
FIG. 2 is a view showing different steps for the display device of FIG. 1 to navigate between two different display layers.
Figure 3:
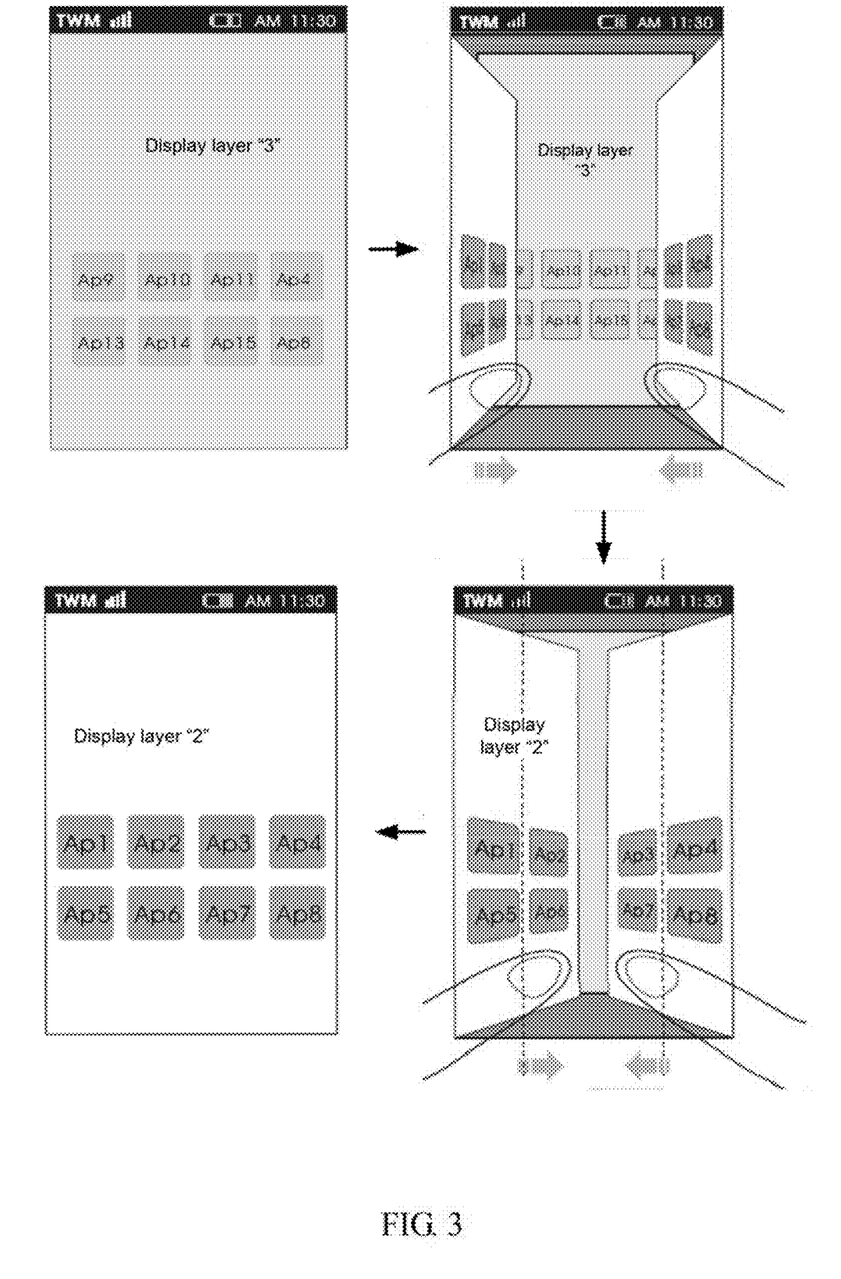
FIG. 3 is similar to FIG. 2, but showing different steps to navigate in reverse between the two different display layers.

When the expanding gesture is performed, the control module 103 expands the distance between relevant columns or rows of icons 200 currently displayed to reveal columns and rows of other icons 200 displayed on the target display layer, and visually compresses the old (the formerly-displayed) icons 200 to two opposites edges (the two sides or to the top and bottom) of the display panel 20 as the icons 200 displayed on the target display layer are revealed during the expanding gesture. For example, as illustrated in FIG. 2, the user moves two fingertips apart to reveal display layer "3" instead of display layer "2," to view icons 200 displayed on display layer "3." When the pinching gesture is performed, the control module 103 narrows the distance between columns or rows of different icons 200 displayed on the target display layer which are introduced respectively from two opposite edges of the display panel 20 to cover columns and rows of the icons 200 currently displayed, and visually expands the newly-introduced icons 200 during the pinching gesture. For example, as illustrated in FIG. 3, the user can bring the two fingertips together to cover display layer "3" with revealed display layer "2," to view the icons 200 of display layer "2."

In at least one embodiment, when the expanding gesture is performed, the control module 103 visually compresses the formerly-displayed icons 200 until the formerly-displayed icons 200 disappear through two opposite edges of the display panel 20. When the pinching gesture is performed, the control module 103 visually expands the newly-introduced icons 200 until the icons 200 currently displayed are covered over.

In at least one embodiment, when the expanding gesture is performed, the control module 103 visually compresses the formerly-displayed icons 200 until the expanding gesture reaches a first preset location on the touch screen 10, and then snaps to a display of the entire target display layer on the display panel 20. When the pinching gesture is performed, the control module 103 visually expands the newly-introduced icons 200 until the pinching gesture reaches a second preset location on the touch screen 10, and then snaps to a display of the entire target display layer on the display panel 20. The first and the second preset locations can be a same location or different locations. In this illustrated embodiment, each of the first and the second preset locations is defined by two parallel vertical lines or two parallel horizontal lines on the touch screen 10.

In at least one embodiment, the expanding gesture is used to navigate to a next display layer, the target display layer being the next display layer. The pinching gesture is used to navigate in reverse to a previous display layer, the target display layer being the previous display layer. More specifically, when the expanding gesture or the pinching gesture is performed on the touch screen 10, the analyzing module 102 further determines whether the current display layer is the last available display layer or the starting display layer. In either case, the control module 103 performs no action.

Figure 4:
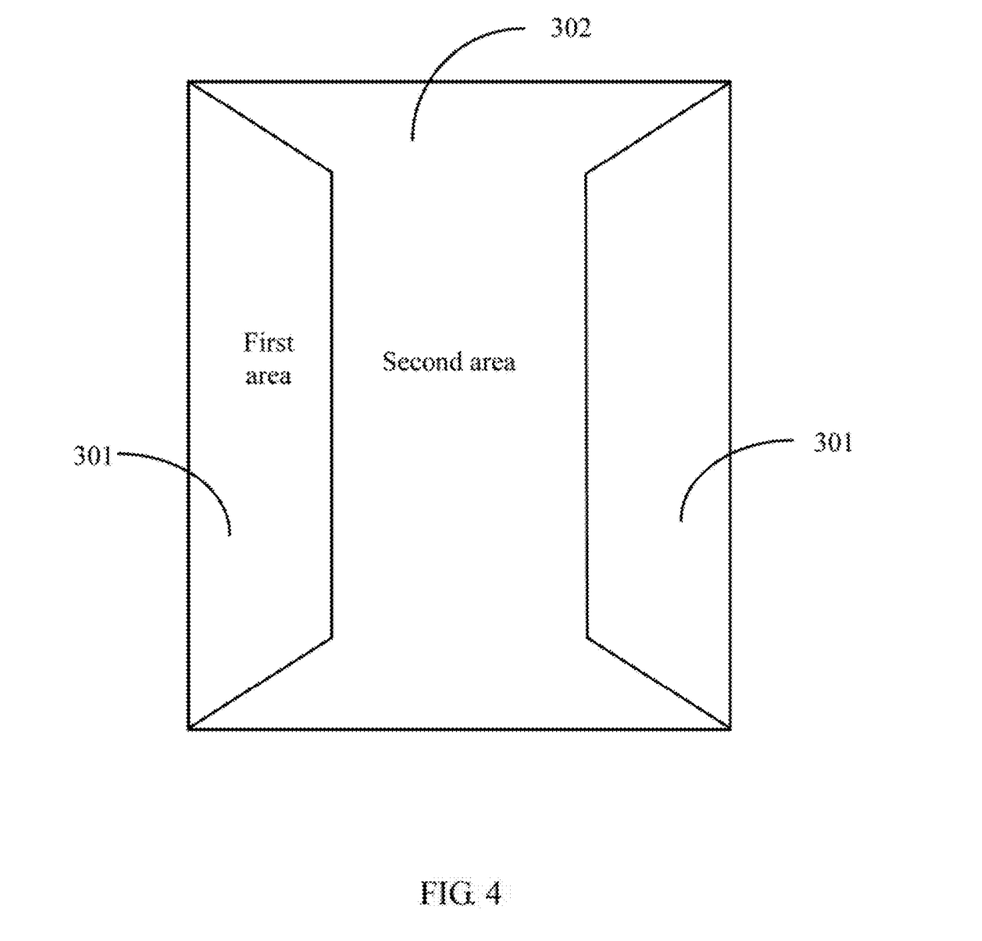
FIG. 4 is a view of an embodiment of a blank page stored in the display device of FIG. 1.
Figure 5:
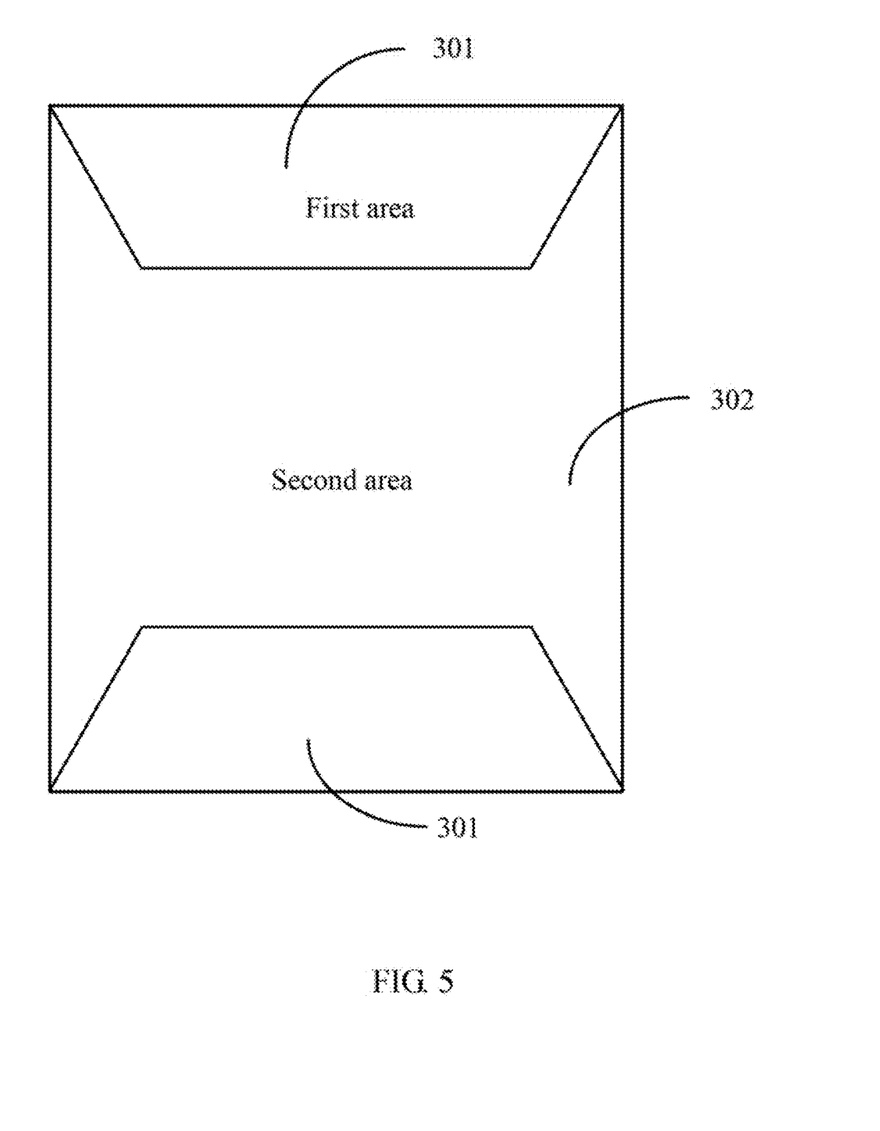
FIG. 5 is similar to FIG. 4, but showing the blank page in another layout.

In at least one embodiment, the storage unit 30 can store a number of first blank pages. FIG. 4 illustrates each first blank page including two first areas 301 and a second area 302 located between the two first areas 301. The two first areas 301 are located at sides of each first blank page. Each of the first areas 301 and the second area 302 of successive first blank pages are gradually decreased or increased in size. FIG. 5 illustrates a number of second blank pages similar to the first blank pages, but showing the two first areas 301 located at top and bottom of each second blank page. Each blank page is combined with a current display layer and a target display layer to form a combined layer which is described below. Different combined layers can show different steps for navigating from a current display layer to a target display layer.

Referring to FIG. 1, in this illustrated embodiment, the control module 103 can further include an obtaining sub-module 1031, a combining sub-module 1032, and a display control sub-module 1033.

The obtaining sub-module 1031 obtains successive blank pages according to the determined target display layer, and covers each obtained blank page over the current display layer. In at least one embodiment, when the determined target display layer is the next display layer, the first area 301 of the successive blank pages is gradually decreased in size, and the second area 302 of the successive blank pages is gradually increased in size. When the determined target display layer is the previous display layer, the successive blank pages are obtained in an opposite order (namely, in reverse). That is, the first area 301 of the successive blank pages is gradually increased in size, and the second area 302 of the successive blank pages is gradually decreased in size.

The combining sub-module 1032 adds contents (including the icons displayed) of the current display layer to the two first areas 301 of each obtained blank page, determines a portion of the target display layer to match the second area 302 of each obtained blank page, and adds contents of the determined portion to the second area 302 of each obtained blank page, thereby forming a number of combined layers as shown in FIG. 2. The contents of the current display layer or the target display layer can further include a wallpaper. Specifically, the combining sub-module 1032 first adjusts the overall size and shape of contents of the target display layer to match the overall sizes and shapes of the two first areas 301 of each blank page, and then adds the contents after the adjustment.

The combining sub-module 1032 further adds contents of the target display layer to the two first areas 301 of each blank page, determines a portion of the current display layer to match the second area 302 of each blank page, and adds contents of the determined portion to the second area 302 of each blank page, thereby forming a number of combined layers as shown in FIG. 3. Specifically, the combining sub-module 1032 first adjusts the overall size and shape of the contents of the current display layer to match the sizes and shapes of the two first areas 301 of each blank page, and then adds the contents after the adjustment.

The display control sub-module 1033 controls the display panel 20 to successively display the combined layers.

Figure 6:
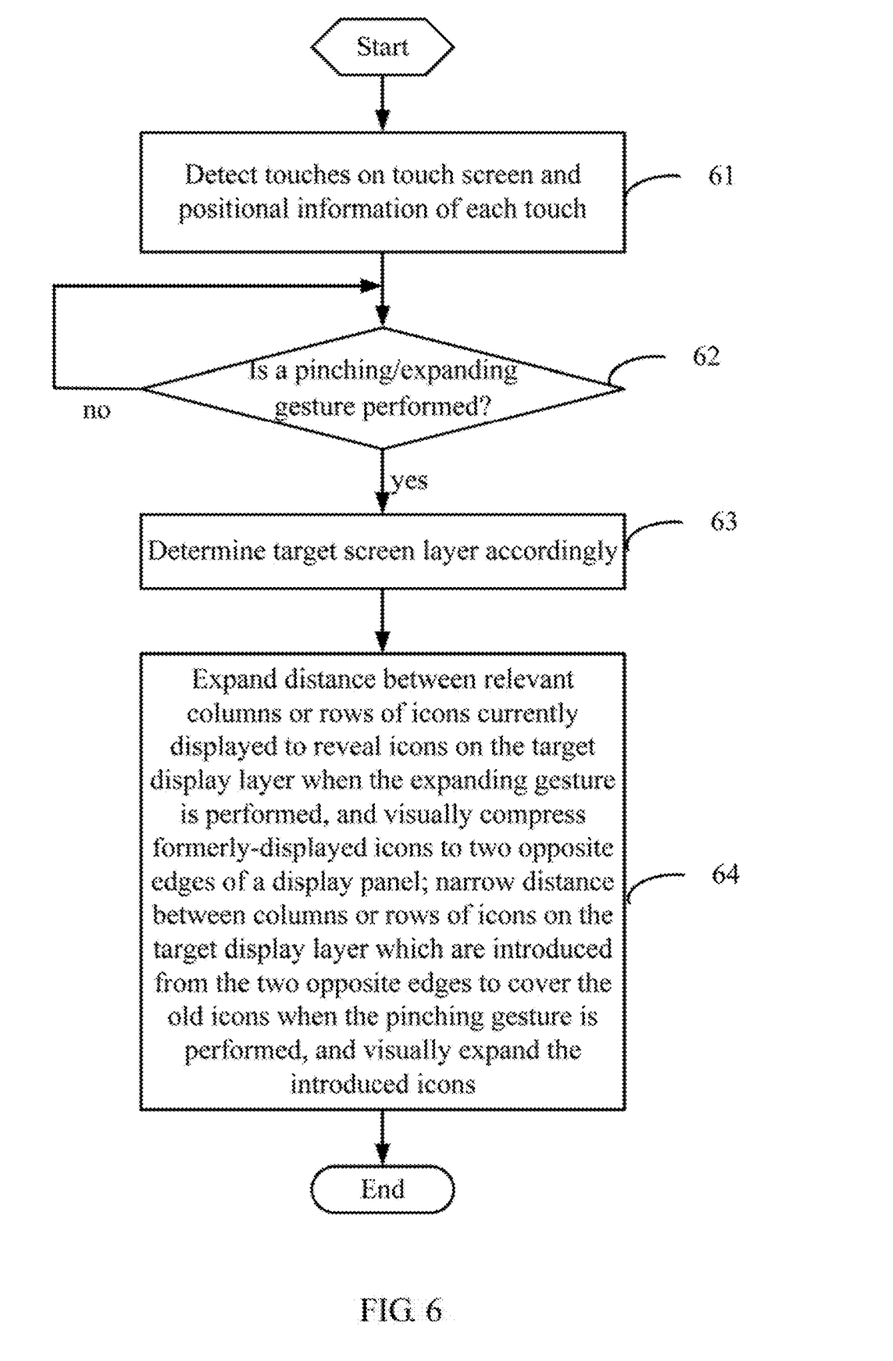
FIG. 6 is a flowchart of an embodiment of a method for navigating between display layers.

FIG. 6 is a flowchart of an embodiment of a method for navigating between display layers of a display device. The display device includes a touch screen, a display, and a storage unit.

In block 61, a detecting module detects touches on the touch screen, and detects positional information of each detected touch.

In block 62, an analyzing module identifies whether a pinching gesture or an expanding gesture is performed on the touch screen according to the detected positional information, if yes, the procedure goes to block 63; otherwise, block 62 is repeated.

In block 63, the analyzing module determines a target display layer accordingly.

In block 64, a control module expands the distance between relevant columns or rows of icons currently displayed to reveal columns and rows of other icons displayed on the target display layer when the expanding gesture is performed, and visually compresses the formerly-displayed icons to two opposite edges of the display panel 20 as the icons displayed on the target display layer are revealed during the expanding gesture; the control module further narrows the distance between columns or rows of different icons displayed on the target display layer which are introduced respectively from two opposite edges of the display panel 20 to cover columns and rows of the icons currently displayed when the pinching gesture is performed, and visually expands the newly-introduced icons during the pinching gesture.

Figure 7:
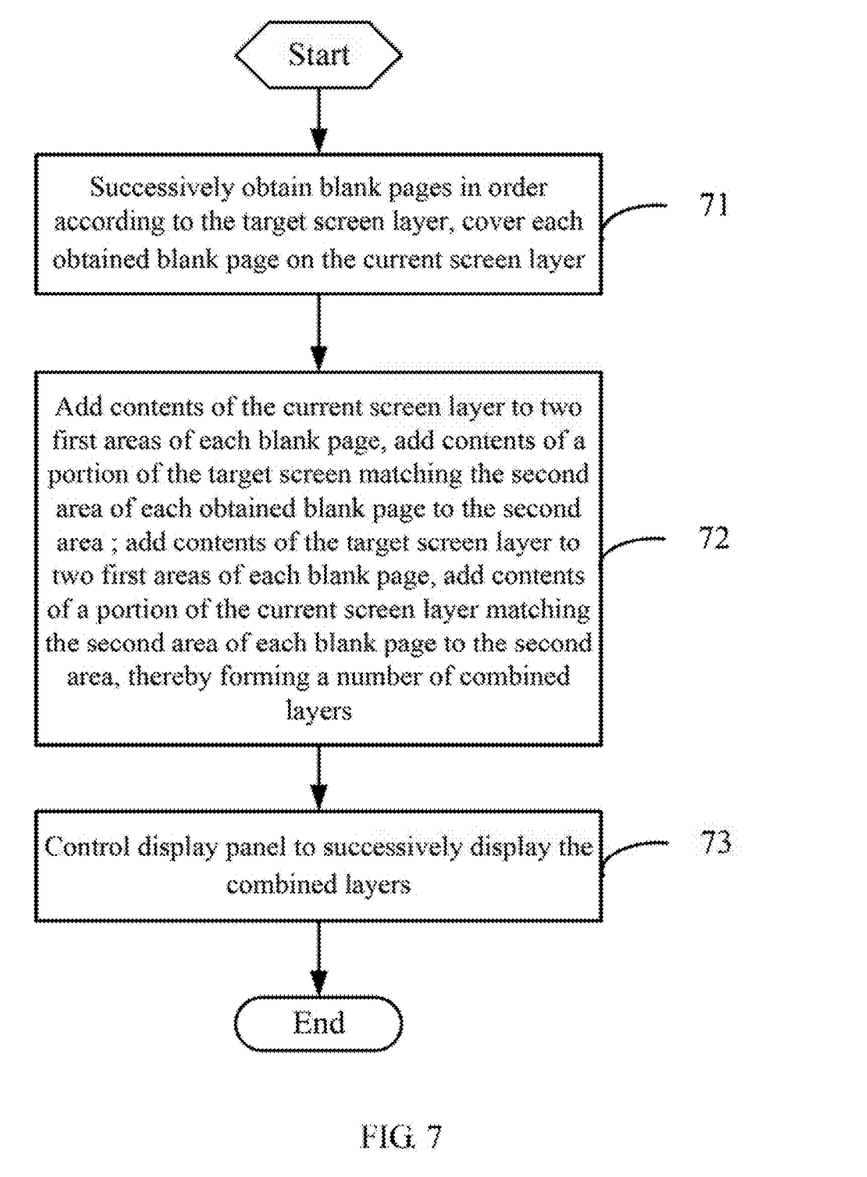
FIG. 7 is a sub-flowchart of block 64 of the method of FIG. 6.

FIG. 7 is a sub-flowchart of the block 64 of the method of FIG. 6.

In block 71, an obtaining sub-module obtains successive blank pages according to the target display layer, and covers each obtained blank page over the current display layer. The blank pages are stored in the storage unit. Each first blank page can include two first areas and a second area located between the two first areas. Each of the first areas 301 and the second area 302 of successive first blank pages are gradually decreased or increased in size.

In block 72, a combining sub-module adds contents of the current display layer to the two first areas of each obtained blank page, determines a portion of the target display layer to match the second area of each obtained blank page, and adds contents of the determined portion to the second area of each obtained blank page, thereby forming a number of combined layers; the combining sub-module further adds contents of the target display layer to the two first areas of each blank page, determines a portion of the current display layer to match the second area of each blank page, and adds contents of the determined portion to the second area of each blank page, thereby forming a number of combined layers.

In block 73, a display control sub-module controls the display panel to successively display the combined layers.

The described embodiments and their advantages will be understood from the foregoing description. It will be apparent that various changes may be made thereto without departing from the scope of the disclosure or sacrificing all of its material advantages, the examples described merely being exemplary embodiments of the present disclosure. The described embodiments are not intended to limit the scope of the following claims.

What is claimed is:

1. A display device comprising:
   a touch screen;
   a display panel for displaying a plurality of display layers each comprising icons arranged in columns and rows;
   a storage unit storing a plurality of modules; and
   a processor to execute the plurality of modules,
   wherein, the plurality of modules comprises:
      a detecting module that detects touches on the touch screen, and detects positional information of each detected touch;
      an analyzing module that identifies whether a pinching gesture or an expanding gesture is performed on the touch screen according to the detected positional information, and determines a target display layer accordingly; and
      a control module that expands a distance between relevant columns or rows of icons currently displayed to reveal columns and rows of other icons displayed on the target display layer when the expanding gesture is performed, and visually compresses formerly-displayed icons to two opposite edges of the display panel as the icons displayed on the target display layer are revealed during the expanding gesture; and narrows a distance between columns or rows of icons displayed on the target display layer which are introduced respectively from the two opposite edges to cover columns and rows of the icons currently displayed when the pinching gesture is performed, and visually expands newly-introduced icons during the pinching gesture.

2. The display device of claim 1, wherein when the expanding gesture is performed, the control module visually compresses the formerly-displayed icons until the formerly-displayed icons disappear through the two opposite edges of the display panel; when the pinching gesture is performed, the control module visually expands the newly-introduced icons until the icons currently displayed are covered over.

3. The display device of claim 1, wherein when the expanding gesture is performed, the control module visually compresses of the formerly-displayed icons until the expanding gesture reaches a first preset location on the touch screen, and snaps to a display of an entire target display layer on the display panel; when the pinching gesture is performed, the control module visually expands the newly-introduced icons until the pinching gesture reaches a second preset location on the touch screen, and snaps to a display of an entire target display layer on the display panel.

4. The display device of claim 3, wherein each of the first and the second preset locations is defined by parallel vertical lines or two parallel horizontal lines on the touch screen.

5. The display device of claim 1, wherein the analyzing module further identifies whether fingertips are placed on either side of an imagined vertical line between two columns of icons or an imagined horizontal line between two rows of icons currently being displayed, before determining the target display layer.

6. The display device of claim 1, wherein the analyzing module determines that the target display layer is a next display layer if the expanding gesture is performed on the touch screen, and determines that the target display layer is a previous display layer if the pinching gesture is performed on the touch screen.

7. The display device of claim 1, wherein the storage unit further stores a plurality of blank pages, each blank page comprises two first areas and a second area located between the two first areas, the control module further comprises:
   an obtaining sub-module that obtains successive blank pages according to the determined target display layer, and covers each obtained blank page over a current display layer;
   a combining sub-module that adds contents of the current display layer to the two first areas of each obtained blank page, determines a portion of the target display layer to match the second area of each obtained blank page, and adds contents of the determined portion to the second area of each obtained blank page; and adds contents of the target display layer to the two first areas of each obtained blank page, determine a portion of the current display layer to match the second area of each obtained blank page, and adds contents of the determined portion to the second area of each obtained blank page, thereby forming a plurality of combined layers; and
   a display control sub-module that controls the display panel to successively display the combined layers.

8. The display device of claim 7, wherein when the determined target display layer is the next display layer, the first area of the successive blank pages is gradually decreased in size, and the second area of the successive blank pages is gradually increased in size; when the determined target display layer is the previous display layer, the first areas of the successive blank pages is gradually increased in size, and the second area of the successive blank pages is gradually decreased in size.

9. The display device of claim 7, wherein the combining sub-module adjusts an overall size and shape of contents of the current display layer or the target display layer to match overall sizes and shapes of the two first areas of each obtained blank page, and adds the contents after the adjustment.

10. A method for navigating between display layers of a display device, the display device comprising a touch screen and a display, the display displaying a plurality of display layers each comprising icons arranged in columns and rows, the method comprising:
   detecting touches on the touch screen, and detecting positional information of each detected touch;
   identifying whether a pinching gesture or an expanding gesture is performed on the touch screen according to the detected positional information, and determining a target display layer accordingly; and
   expanding a distance between relevant columns or rows of icons currently displayed to reveal columns and rows of other icons displayed on the target display layer when the expanding gesture is performed, and visually compressing formerly-displayed icons to two opposite edges of the display as the icons displayed on the target display layer are revealed during the expanding gesture; or narrowing a distance between columns or rows of icons displayed on the target display layer which are introduced respectively from the two opposite edges to cover columns and rows of the icons currently displayed when the pinching gesture is performed, and visually expanding the newly-introduced icons during the pinching gesture.

11. The method of claim 10, wherein the formerly-displayed icons are visually compressed until the formerly-displayed icons disappear through the two opposite edges of the display; and the newly-introduced icons are visually expanded until the icons currently displayed are covered over.

12. The method of claim 10, wherein the formerly-displayed icons are visually compressed until the expanding gesture reaches a first preset location on the touch screen, and then an entire target display layer is snapped to display on the display; and the newly-introduced icons are visually expanded until the pinching gesture reaches a second preset location on the touch screen, and then an entire target display layer is snapped to display on the display.

13. The method of claim 12, wherein each of the first and the second preset locations is defined by parallel vertical lines or two parallel horizontal lines on the touch screen.

14. The method of claim 10, wherein the step of identifying whether a pinching gesture or an expanding gesture is performed on the touch screen further comprises:
identifying whether fingertips are placed on either side of an imagined vertical line between two columns of icons or an imagined horizontal line between two rows of icons currently being displayed.

15. The method of claim 10, wherein the target display layer is a next display layer if the expanding gesture is performed on the touch screen, and the target display layer is a previous display layer if the pinching gesture is performed on the touch screen.

16. The method of claim 10, wherein the storage unit further stores a plurality of blank pages, each blank page comprises two first areas and a second area located between the two first areas, and the method further comprises:
obtaining successive blank pages according to the determined target display layer, and covering each obtained blank page over a current display layer;
adding contents of the current display layer to the two first areas of each obtained blank page, determining a portion of the target display layer to match the second area of each obtained blank page, and adding contents of the determined portion to the second area of each obtained blank page; or adding contents of the target display layer to the two first areas of each obtained blank page, determining a portion of the current display layer to match the second area of each obtained blank page, and adding contents of the determined portion to the second area of each obtained blank page, thereby forming a plurality of combined layers; and
controlling the display to successively display the combined layers.

17. The method of claim 10, wherein when the determined target display layer is the next display layer, the first area of the successive blank pages is gradually decreased in size, and the second area of the successive blank pages is gradually increased in size; when the determined target display layer is the previous display layer, the first areas of the successive blank pages is gradually increased in size, and the second area of the successive blank pages is gradually decreased in size.

18. A display device, comprising:
a touch screen activated display panel;
a storage unit storing a plurality of modules; and
a processor to execute the plurality of modules,
wherein, the plurality of modules comprises:
a detecting module that detects one or more activated areas of the touch screen including position and motion of the activated areas;
an analyzing module that determines whether a distance between one or more of the detected activated areas is expanding or narrowing and determines a target display layer accordingly; and
a control module that, when the distance between one or more activated touch screen areas expands, expanding a distance between icons currently displayed on the display panel to display additional icons on the target display layer and visually compressing formerly displayed icons on opposite edges of the display panel and, when the distance between one or more activated touch screen areas narrows, narrowing a distance between new icons displayed on the target display layer to cover icons currently displayed and introducing and expanding new icons.

19. The display device of claim 18, wherein when the distance between one or more activated touch screen areas expands, the control module visually compresses the formerly-displayed icons until the formerly-displayed icons disappear through the two opposite edges of the display panel; when the distance between one or more activated touch screen areas narrows, the control module visually expands the newly icons until the icons currently displayed are covered over.

20. The display device of claim 18, wherein when the distance between one or more activated touch screen areas expands, the control module visually compresses the formerly-displayed icons until the expanding activated touch screen areas reach a first preset location on the touch screen, and snaps to a display of an entire target display layer on the display panel; when the distance between one or more activated touch screen areas narrows, the control module visually expands the newly icons until the narrowing activated touch screen areas reach a second preset location on the touch screen, and snaps to a display of an entire target display layer on the display panel.

* * * * *